United States Patent Office
3,576,778
Patented Apr. 27, 1971

3,576,778
NOVEL HEAT SEAL ADHESIVES BASED ON POLYCAPROLACTONE
Irwin J. Davis, Plainfield, N.J., assignor to National Starch and Chemical Corporation, New York, N.Y.
No Drawing. Filed Oct. 13, 1969, Ser. No. 865,967
Int. Cl. C08f 45/52, 29/24
U.S. Cl. 260—28.5
8 Claims

ABSTRACT OF THE DISCLOSURE

Novel heat seal adhesives based on polycaprolactone are described; said adhesives being characterized by their low heat seal temperatures and non-blocking properties.

BACKGROUND OF THE INVENTION

Heat seal adhesives comprise a class of adhesives which yield dry films or coatings which are essentially devoid of tackiness at ambient temperatures and which require the application of heat in order to permit their being adhesively bonded to a substrate. The temperature at which such adhesives become tacky is known as the activation temperature and this will, of course, vary depending upon the composition of the adhesive. Although heat seal adhesives enjoy widespread use in the packaging industry, their utilization is, in many instances, limited because of certain undesirable properties such, for example, as their tendency to block and the excessively high temperature required for their activation.

In order to yield satisfactory results in commercial usage, heat seal adhesives must possess a number of important properties. Thus, films of the adhesive should be non-tacky at temperatures up to about 130° F. Furthermore, films of the adhesive which have been applied to substrates which have been placed adjacent to one another or in stacks should show no tendency to adhere to one another at ambient temperatures up to about 130° F. Such adhesion or blocking to adjacent surfaces, while often tolerated with this class of adhesives, is, of course, highly undesirable. In addition, the activation temperature of these adhesives should not be excessively high, but should preferably be below about 400° F. Of greater significance, however, is that the films derived from these adhesives must be capable of forming strong, durable bonds with a wide variety of substrates such, for example, as glass, wood metal, metallic foils, paper, polymeric films, and the like.

It is, accordingly, the principal object of this invention to provide heat seal adhesives which are non-blocking at ambient temperatures, do not require excessively high activation temperatures and which provide strong, durable bonds.

Additional objects and advantages of the present invention will be apparent from the following disclosure.

TECHNICAL DISCLOSURE OF THE INVENTION

The novel heat seal adhesives of this invention are based on poly(epsilon-caprolactone), a thermoplastic polymer which softens at a low temperature. The structure of poly(epsilon-caprolactone), hereinafter referred to as polycaprolactone, corresponds to:

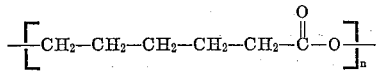

wherein $n$ represents the number of repeating units in the polymer and can vary from 100 to 1,000 depending on the particular molecular weight of the polymer. The weight average molecular weight of the polycaprolactones useful in the adhesives of this invention should be at least 15,000. Experimental evidence indicates that the polycaprolactone which has a high molecular weight generally tends to provide heat seal adhesives displaying stronger adhesive bonds. Polycaprolactones are available commercially and also may be prepared by the polymerization of epsilon-caprolactone by means of procedures well known to those skilled in the art.

The novel heat seal adhesives of this invention comprise a blend in one or more organic solvents of:

(A) From about 55 to 80%, by weight, of polycaprolactone, (B) From about 5 to 35%, by weight, of a chlorinated paraffin wax having a chlorine content of at least 60%, by weight, and (C) From about 5 to 35%, by weight, of one or more random vinyl chloride copolymers.

The chlorinated paraffin waxes useful in the present heat seal adhesives should, desirably, have a non-crystalline, amorphous structure, a molecular weight ranging from about 500 to 1,100 and may range in form from being a viscous liquid at room temperature to a solid having a softening point up to about 250° F. Commercially available chlorinated paraffin waxes corresponding to the latter requirements include Clorowax 70 sold by Diamond Shamrock Corp., Cleveland, Ohio and Chlorez 700 sold by Dover Chemical Corp., Dover, Ohio.

Regarding the random copolymers of vinyl chloride which may be used in the novel heat seal adhesives of this invention, these may include random copolymers of vinyl chloride with at least one monomer selected from the group consisting of vinyl esters of $C_2$–$C_5$ monocarboxylic acids such as vinyl acetate and vinyl butyrate; vinyl ethers such as vinyl methyl ether and vinyl ethyl ether; vinylidene halides such as vinylidene chloride; nitriles of ethylenically unsaturated monocarboxylic acids such as acrylonitrile; ethylenically unsaturated monocarboxylic acids such as acrylic and methacrylic acids; the linear and branched $C_1$–$C_8$ alkyl esters of ethylenically unsaturated monocarboxylic acids such as ethyl acrylate, 2-ethylhexyl acrylate and methyl methacrylate; anhydrides of ethylenically unsaturated dicarboxylic acids such as maleic anhydride; the $C_1$–$C_4$ alkyl half esters of ethylenically unsaturated dicarboxylic acids such as methyl hydrogen maleate and, the $C_1$–$C_4$ alkyl diesters of ethylenically unsaturated dicarboxylic acids such as diethyl maleate and dibutyl maleate. Also applicable are the partially hydrolyzed copolymers of vinyl chloride with vinyl esters such, for example, as the partially hydrolyzed copolymer of vinyl chloride and vinyl acetate. These vinyl chloride based copolymers should contain from about 60 to 92%, by weight, of vinyl chloride and have a molecular weight of about 30,000 to 90,000.

The vinyl chloride copolymers may be prepared by means of various polymerization procedures well known to those skilled in the art. However, they are most conveniently prepared by means of free radical initiated solution or suspension polymerization techniques. Thus, when solution polymerization techniques are employed the polymers may be then used in the form of the organic solvent solution in which they were originally prepared. When suspension polymerization techniques are employed the polymers are recovered in dry form prior to their use herein.

The procedure for preparing the heat seal adhesives of this invention involves the dissolving of the polycaprolactone, the chlorinated paraffin wax and the vinyl chloride copolymer in a suitable mixing churn utilizing one or more organic solvents. Examples of useful solvents for preparing the adhesive lacquers include toluene, xylene, benzene, cyclohexane, ethyl acetate, isopropyl acetate, methyl ethyl ketone, isobutyl ketone, methylene chloride, etc. It is ordinarily preferable, in dissolving these ingredients, to include at least about 15% of a ketonic solvent, such as methyl ether ketone, together with a major portion of toluene in the solvent mixture, however, any solvent system which serves to dissolve the ingredients is satisfactory for use. Mixing is continued until a smooth, homogeneous solution is obtained whereupon the resulting adhesive lacquer is ready for use. These lacquers are ordinarily prepared so as to contain from about 20 to 60%, by weight, of solids.

If desired, conventional additives may be incorporated into the heat seal adhesives of this invention in order to modify certain properties of the films cast therefrom. Thus, among these additives may be included wax diluents such as liquid polypropylene having a molecular weight in the range of 700 to 1,200; petroleum waxes such as paraffin and microcrystalline waxes; polyethylene greases; hydrogenated animal, fish and vegetable fats; mineral oil; and synthetic waxes such as Fischer-Tropsch wax; stabilizers and antioxidants such as hydroxytoluene, heavy molecular weight phenols and substituted phosphites; and colorants such as titanium dioxide and wachtung red. It should also be noted that minor quantities of isotactic polypropylene may be added in order to vary the flexibility characteristics of the adhesive films cast from these heat seal adhesives. Plasticizers such as phthalate esters, phosphate esters, chlorinated biphenols, etc. may likewise be incorporated into these adhesives in order to vary the flexibilty of the films derived therefrom. The total concentration of these optional additives should not exceed about 15% based on the total combined weight of the polycaprolactone, paraffin wax and the vinyl chloride copolymer. These optional additives may be added at any point during the mixing or dissolving operation utilized for the preparation of the adhesives of this invention.

Fillers, such as are commonly employed as loading agents in adhesives, may also be added to the adhesives of this invention, if desired. Examples of such fillers include clay, talc, silica, calcium carbonate, and the like. The filler can be added at any time during the preparation of the adhesives, and mixtures of two or more fillers may also be used. The concentration of filler should not exceed about 30%, based on the total combined weight of the ploycaprolactone, paraffin wax and the vinyl chloride copolymer.

In using the adhesive lacquers of this invention for the coating of labels, box panels and the like, they may be applied by means of any coating technique whose use is desired by the practitioner. Thus, these lacquers may be applied by use of any mechanical coating process such as air knife, trailing blade, knife coater, reverse roll or gravure coating technique. Subsequent to its application, the solvent is removed from the adhesive film by means of a drying step which ordinarily utilizes forced air which is either slightly heated or at room temperature. The adhesive lacquer should be applied at a coating weight which will yield a dry film thickness in the range of from about 0.5 to 5 mils and preferably at from about 1 to 3 mils (one mil=0.001 inch). The coating weight at which these adhesives are applied will, of course, vary according to such factors as the particular copolymer and other required ingredients which are selected and the substrates to which it is being applied.

Optionally, the adhesive may be coated on to a conventional silicone-coated release paper and stored until needed at which time the adhesive film can be stripped from the release paper and applied to a selected substrate.

When the dry films derived from the adhesives of this invention are activated by heating to a temperature above about 250° F. they become tacky and capable of forming adhesive bonds. For example, in a typical application of these novel adhesives, a metallic label would be coated with a film of the adhesive lacquer and dried in a forced air oven so as to yield a dry film thickness of about 2 mils. While the thus coated label can be immediately used, if desired, it is preferable not to bond these newly dried films until a sufficient time has elapsed for the adhesive to crystallize or orient in a non-block condition, as manifested by a clouding or whitening of the cast film. This crystallization time varies with the selected formulation and may take a period of from a few minutes to 3 to 4 hours. Prior to such crystallization, the adhesive film is clear, soft and weak, while after crystallization, the film is cloudy, non-tacky and strong. Thus, after crystallization or orientation, the label can then be bonded to any desired solid substrate with the use of any conventional heat sealing equipment operating at a temperature of from about 250 to 350° F. and a dwell time of from 2 to 5 seconds and a pressure of from slightly above zero to about 100 p.s.i.

In addition to the heat seal adhesives described hereinabove, which may be characterized as being of the direct seal type, I have found that heat seal adhesives displaying the property of delayed-tack may be obtained, if desired, by simply replacing the required vinyl chloride polymer with a chlorinated polyolefin. Such delayed-tack heat seal adhesives yield films which are non-tacky and non-blocking at ambient temperatures but, upon the application of heat that renders them in a molten condition they become tacky and capable of forming adhesive bonds. Furthermore, they remain tacky even subsequent to their having cooled down to room temperature for periods up to 35 seconds. Thus, such delayed tack adhesives are particularly useful in end-use applications wherein one must utilize a heat sealing process in which the simultaneous application of heat and pressure is not feasible.

The chlorinated polyolefins useful in these delayed tack heat seal adhesives should, desirably, have a non-crystalline, amorphous structure, a molecular weight ranging from about 2,000 to 40,000 and a chlorine content of at least about 45%, by weight. Specific examples of useful chlorinated polyolefins include Chlorinated Polyethylene Resin MX2243.25 sold by Dow Chemical Company, Midland, Mich. and Chlorinated Polyolefin 310–6 sold by Eastman Chemical Products, Inc., Kingsport, Tenn.

Thus, it will be seen that the heat seal adhesives displaying delayed tack properties comprise a blend in one or more organic solvents of:

(A) from about 55 to 80%, by weight, of polycaprolactone,
(B) from about 5 to 35%, by weight, of a chlorinated paraffin wax having a chlorine content of at least about 60%, by weight, and
(C) from about 5 to 35%, by weight, of one or more chlorinated polyolefins having a chlorine content of at least about 45%, by weight.

Ordinarily, either toluene or methylene chloride are the preferred organic solvents used in dissolving these delayed-tack heat seal adhesives, however, mixtures of two or more solvents may also be utilized.

Optional additives as well as fillers, such as are described in connection with the direct heat seal adhesives, may also, if desired, be incorporated into these delayed-tack heat seal adhesives.

All of the novel heat seal adhesives of this invention may be utilized in a wide variety of applications such, for example, as for the sealing of cartons and for the preparation of tapes and labels.

This invention is further illustrated by the following examples in which all parts given are by weight unless otherwise noted.

EXAMPLE I

This example illustrates the preparation and use of a heat seal adhesive typical of the novel products of this invention.

A total of 625 parts of polycaprolactone having a weight average molecular weight of about 40,000 together with 187 parts of a chlorinated paraffin wax having a chlorine content of 70%, by weight, and a molecular weight of about 900, and 187 parts of a vinyl chloride:vinyl acetate: maleic anhydride (86:13:1) terpolymer were dissolved in 2,000 parts of a solvent mixture consisting of 1,600 parts of toluene and 400 parts of methyl ethyl ketone. Mixing was continued until a clear, homogeneous solution was obtained.

In order to demonstrate the applicability of the above described adhesive in typical heat sealing operation, it was applied to a piece of 2 mil aluminum foil by means of a knife coater so as to yield a dry film having a thickness of 2 mils. The wet film was dried in a forced air oven set at a temperature of 140° F. The coated aluminum foil was cut into smaller individual pieces (1" by 6") which were then heat sealed to an aluminum plate having a thickness of 0.125 inch by applying the coated foil to the aluminum while contacting the foil with a heat sealing apparatus operating at a temperature of 325° F., a dwell time of 4 seconds and utilizing a pressure of 60 p.s.i. (pounds per square inch). After a 24 hour conditioning period at 72° F. and a relative humidity of 50% the peel adhesion value of the thus-formed laminate was determined. The latter test consists of measuring the force which is necessary to strip or delaminate the aluminum foil at a 180° angle from the aluminum plate at a rate of pull or withdrawal, of 12 inches per minute. An Instron Tensile Tester was used for this determination. Thus, the force necessary to effect the delamination was recorded as the "180° Peel Adhesion" value which, in this instance, was 192 ounces per inch.

The blocking properties of the films cast from the above described adhesive lacquers were determined according to ASTM 918-49. It was found that the films were entirely devoid of blocking at temperatures of 130° F. when placed face to back. It is seen, therefore, that the heat seal adhesive whose preparation is set forth hereinabove exhibited excellent adhesion and non-blocking properties.

EXAMPLE II

This example illustrates the preparation of additional formulations of the novel heat seal adhesives of this invention.

In a repetition of the procedure described in Example I, hereinabove, five adhesive formulations were prepared according to the proportions set forth in Table I, below. The polycaprolactone, the chlorinated paraffin wax and the vinyl chloride terpolymer utilized in these formulations were identical, respectively, to the corresponding materials described in Example I. Each formulation was dissolved in an organic solvent mixture as described therein so as to yield solutions having a solids content of about 50%, by weight. Each of the resulting lacquers was coated onto a piece of 2 mil aluminum foil and subjected to the 180° peel adhesion test by means of the procedure described in Example I. Results of the peel adhesion test and of the blocking properties of the various formulations are summarized in Table I.

TABLE I

| Formulation | Polycaprolactone, percent | Chlorinated paraffin wax, percent | Vinyl-chloride terpolymer, percent | Peel adhesion, ounces/in. | Blocking at 130° F. |
|---|---|---|---|---|---|
| A | 57.2 | 17.2 | 25.6 | 180 | None. |
| B | 62.5 | 6.2 | 31.3 | 140 | None. |
| C | 71.4 | 21.4 | 7.2 | 120 | None. |
| D | 51.3 | 25.6 | 23.1 | 232 | Substantial. |
| E | 83.3 | 8.3 | 8.3 | 0 | None. |

It will be noted from the above results, that formulations A, B and C, which contained each of the required ingredients in a concentration within the specified limits, displayed excellent adhesion and non-blocking properties. In contrast, formulations D and E contained polycaprolactone in a concentration outside of the specified limits and were found to be unsatisfactory. Thus, formulation D, which contained a low concentration of polycaprolactone, exhibited blocking at 130° F. while formulation E, which contained a high concentration of polycaprolactone, exhibited a complete absence of adhesive properties.

EXAMPLE III

This example illustrates the preparation of additional formulations of the heat seal adhesives of this invention.

The general procedure set forth in Example I, hereinabove, was used in preparing each of the following formulations.

Formulation A:                           Parts
    Polycaprolactone having a weight average molecular weight of 15,000 _____ 78
    Chlorinated paraffin wax (chlorine content 60%) _____ 12
    Vinyl chloride:vinyl acetate:vinyl alcohol (91:3:6) terpolymer _____ 10

Formulation B:
    Polycaprolactone having a weight average molecular weight of 40,000 _____ 60
    Chlorinated paraffin wax (chlorine content 75%) _____ 10
    Vinyl chloride:vinyl acetate (86:14) copolymer__ 30
    Dioctyl phthalate (plasticizer) _____ 1

Formulation C:
    Polycaprolactone having a weight average molecular weight of 40,000 _____ 70
    Chlorinated paraffin wax (chlorine content 63%) _____ 20
    Vinyl chloride:acrylonitrile (90:10) copolymer__ 10

Formulation D:
    Polycaprolactone having a weight average molecular weight of 40,000 _____ 65
    Chlorinated paraffin wax (chlorine content 70%) _____ 15
    Vinyl chloride:butyl maleate:acrylic acid (83:15:22) terpolymer _____ 20

Each of the above described formulations was dissolved in a 80:20 toluene:acetone solvent mixture so as to yield lacquers having a solids content of from about 30 to 34%, by weight. Films of the resulting lacquers were applied to metallic foil and paper substrates, samples of which were then bonded to aluminum, acrylonitrile:butadiene:styrene plastic, and to a painted wooden surface by means of the procedure described in Example I, hereinabove. No blocking of the various adhesive films was observed at any time and excellent and durable adhesive bonds were obtained in each of the resulting laminates.

EXAMPLE IV

This example illustrates the preparation of the novel heat seal adhesives of this invention which also possess the property of delayed tack.

A total of 626 parts of polycaprolactone having a weight average molecular weight of about 40,000, 187 parts of chlorinated paraffin wax having a chlorine content of 66%, by weight, and a molecular weight of about 900 and 187 parts of a chlorinated polyolefin having a chlorine content of 65%, by weight, designated Chlorinated Polyolefin 310-6 and sold by Eastman Chemical Products, Inc., were dissolved in 2,000 parts of toluene. Mixing was continued until a clear, homogeneous solution was obtained.

The resultant adhesive lacquer was applied to a 2 mil aluminum foil substrate by means of a knife coater. After application of the lacquer to the foil, the wet film was dried in a forced air oven set at a temperature of 140° F. so as to yield a dry film having a thickness of 2 mils. Individual pieces of the coated foil were then bonded onto an aluminum plate having a thickness of 0.125 inch by first applying the uncoated side of the foil to a hot plate maintained at 250° F. When the adhesive became tacky (about 2 seconds was necessary) it was then transferred to the aluminum plate and pressed onto it with a weighted roller.

After a 24 hour conditioning period at 72° F. and a relative humidity of 50%, the peel adhesion value of the thus formed laminate was determined as described in Example I and found to be 128 ounces per inch. The blocking properties of the films were determined according to ASTM 918-49. The films were entirely devoid of blocking at temperatures of 130° F.

In a repetition of the procedure described hereinabove, three additional adhesive formulations were prepared according to the proportions set forth in Table II, below. The various ingredients utilized in preparing these formulations were identical, respectively, to the corresponding materials described hereinabove. Toluene was again used as the solvent. Results of the peel adhesion test and of the blocking properties of the various formulations are summarized in Table II.

TABLE II

| Formulation | Polycaprolactone, percent | Chlorinated paraffin wax, percent | Chlorinated polyolefin, percent | Peel adhesion, ounce/inch | Blocking at 130° F. |
|---|---|---|---|---|---|
| A | 57.2 | 17.2 | 25.7 | 192 | None. |
| B | 60.5 | 30.3 | 9.1 | 165 | None. |
| C | 75.0 | 10.0 | 15.0 | 96 | None. |

The above results clearly demonstrate the excellent adhesion and non-blocking characteristics of the novel heat seal adhesives of this invention wherein a chlorinated polyolefin is substituted for the vinyl chloride copolymer in order to attain a delayed tack heat seal adhesive.

EXAMPLE V

This example illustrates the preparation of another formulation of a delayed tack heat seal adhesive of this invention.

The general procedure set forth in Example IV was used in preparing the following formulation.

```
                                                      Parts
Polycaprolactone having a weight average molecular
  weight of 40,000 ------------------------------  62.5
Chlorinated paraffin wax (chlorine content 77%)--  25.0
Chlorinated polyethylene (chlorine content 48%)--  12.5
```

The resultant adhesive lacquer was applied to paper so as to yield a film having a thickness of about 1 mil after drying. Individual pieces of the coated paper were bonded to glass by activating the adhesive on a hot plate set at 250° F. and transferring the paper to the glass utilizing a delaying period of about 5 seconds. Strong adhesive bonds were obtained in each of the laminates.

Summarizing, it is seen that this invention provides novel polycaprolactone-based heat seal adhesives displaying excellent properties.

Variations may be made in proportions, procedures and materials without departing from the scope of this invention.

What is claimed is:

1. A heat seal adhesive composition comprising a blend in one or more organic solvents of
   (A) from about 55 to 80%, by weight, of polycaprolactone having a minimum average molecular weight of about 15,000,
   (B) from about 5 to 35%, by weight, of a chlorinated paraffin wax having a chlorine content of at least 60%, by weight, and
   (C) from about 5 to 35%, by weight, of an ingredient selected from the group consisting of
      (1) random vinyl chloride copolymers containing from about 60 to 92%, by weight, of vinyl chloride and having a molecular weight of from about 30,000 to 90,000 and
      (2) chlorinated polyolefins having a chlorine content of at least 45%, by weight.

2. The heat seal adhesive composition of claim 1, wherein said random vinyl chloride copolymer is selected from the group consisting of copolymers of vinyl chloride with at least one polymerizable comonomer selected from the group consisting of vinyl esters of $C_2$–$C_5$ monocarboxylic acids, vinyl ethers, vinylidene halides, nitriles of ethylenically unsaturated monocarboxylic acids, ethylenically unsaturated monocarboxylic acids, the linear and branched $C_1$–$C_8$ alkyl esters of ethylenically unsaturated monocarboxylic acids, anhydrides of ethylenically unsaturated dicarboxylic acids, the $C_1$–$C_4$ alkyl half esters of ethylenically unsaturated dicarboxylic acids, the $C_1$–$C_4$ alkyl diesters of ethylenically unsaturated dicarboxylic acids, and the partially hydrolyzed copolymers of vinyl chloride with vinyl esters.

3. The heat seal adhesive composition of claim 1, wherein said chlorinated polyolefin is a chlorinated polyethylene.

4. A heat seal adhesive composition comprising a blend in one or more organic solvents of
   (A) about 62.5%, by weight, of polycaprolactone having a minimum average molecular weight of about 15,000,
   (B) about 18.7%, by weight, of chlorinated paraffin wax having a chlorine content of at least 60% by weight, and
   (C) 18.7, by weight, of an 86:13:1 vinyl chloride:vinyl acetate:maleic anhydride terpolymer.

5. A heat sealable, solid substrate, said substrate being coated on at least one surface with the dried consolidated residue of a blend in one or more organic solvents of
   (A) from about 55 to 80%, by weight, of polycaprolactone having a minimum average molecular weight of 15,000,
   (B) from about 5 to 35%, by weight, of a chlorinated paraffin wax having a chlorine content of at least 60%, by weight, and
   (C) from about 5 to 35%, by weight, of an ingredient selected from the group consisting of
      (1) random vinyl chloride copolymers containing from about 60 to 92%, by weight, of vinyl chloride and having a molecular weight of from about 30,000 to 90,000 and
      (2) chlorinated polyolefins having a chlorine content of at least 45%, by weight.

6. The coated substrate of claim 5, wherein said random vinyl chloride copolymer is selected from the group consisting of copolymers of vinyl chloride with at least one polymerizable comonomer selected from the group consisting of vinyl esters of $C_2$–$C_5$ monocarboxylic acids, vinyl ethers, vinylidene halides, nitriles of ethylenically unsaturated monocarboxylic acids, ethylenically unsaturated monocarboxylic acids, the linear and branched $C_1$–$C_8$ alkyl esters of ethylenically unsaturated monocarboxylic acids, anhydirdes of ethylenically unsaturated dicarboxylic acids, the $C_1$–$C_4$ alkyl half esters of ethylenically unsaturated dicarboxylic acids, the $C_1$–$C_4$ alkyl diesters of ethylenically unsaturated dicarboxylic acids, and the partially hydrolyzed copolymers of vinyl chloride with vinyl esters.

7. The coated substrate of claim 5, wherein said chlorinated polyolefin is a chlorinated polyethylene.

8. A heat sealable, solid substrate which is coated on at least one surface with the dried consolidated residue of a blend in one or more organic solvents of
   (A) about 62.5%, by weight, of polycaprolactone having a minimum average molecular weight of about 15,000,
   (B) about 18.7%, by weight, of chlorinated paraffin wax having a chlorine content of at least 60%, by weight, and (C) 18.7%, by weight, of an 86:13:1 vinyl chloride:vinyl acetate:maleic anhydride terpolymer.

References Cited

UNITED STATES PATENTS

| | | | |
|---|---|---|---|
| 2,888,414 | 5/1959 | Fuller | 260—31.8H |
| 2,890,208 | 6/1959 | Young | 260—78.3 |
| 3,169,935 | 2/1165 | Sherliker | 260—28.5D |
| 3,284,417 | 11/1966 | Hostettler | 260—78.3 |
| 3,333,970 | 8/1967 | Green | 106—15FP |
| 3,423,357 | 1/1969 | Suh | 260—31.8 |

OTHER REFERENCES

Myers and Long, "Film-Forming Compositions," vol. I, part II, 1968, pp. 338–345.

MORRIS LIEBMAN, Primary Examiner

P. R. MICHL, Assistant Examiner

U.S. Cl. X.R.

260—31.2XA, 32.8R, 33.6UA, 33.8UA, 899, 28